United States Patent

Nohara et al.

Patent Number: 4,904,509
Date of Patent: Feb. 27, 1990

[54] INJECTION-MOLDED BODY OF OLEFIN/VINYL ALCOHOL COPOLYMER AND PROCESS FOR PREPARATION THEREOF

[75] Inventors: Shigezo Nohara, Yokohama; Sadao Hirata, Kamakura; Junichi Matsuo, Yokohama; Masami Hirano, Yokohama; Isao Tanikawa, Ayase, all of Japan

[73] Assignee: Toyo Seikan Kaisha, Ltd., Tokyo, Japan

[21] Appl. No.: 269,091

[22] Filed: Nov. 9, 1988

Related U.S. Application Data

[62] Division of Ser. No. 32,646, Mar. 31, 1987, Pat. No. 4,798,697.

[30] Foreign Application Priority Data

Mar. 31, 1986 [JP] Japan .................................. 61-71236

[51] Int. Cl.⁴ ..................... C08L 29/04; C08F 8/12; B32B 27/30
[52] U.S. Cl. ................................ 428/36.6; 428/522; 428/542.8; 525/57; 525/330.6
[58] Field of Search ............ 525/57; 264/330.6, 328.1; 428/36.7, 542.8, 522

[56] References Cited

U.S. PATENT DOCUMENTS

| | | | |
|---|---|---|---|
| 4,349,644 | 9/1982 | Iwanami et al. | 525/57 |
| 4,526,821 | 7/1985 | McHenry et al. | 428/36.7 |
| 4,590,131 | 5/1986 | Yazaki et al. | 428/36.7 |
| 4,672,087 | 6/1987 | Miller et al. | 524/141 |
| 4,743,479 | 5/1988 | Nakamura et al. | 428/36.7 |

Primary Examiner—James Seidleck
Attorney, Agent, or Firm—Sughrue, Mion, Zinn, Macpeak & Seas

[57] ABSTRACT

An injection-molded body comprising a layer of an olefin/vinyl alcohol copolymer having a very high molecular weight is obtained by melt-kneading a composition comprising (i) a high-molecular-weight olefin/vinyl alcohol copolymer having a melt flow rate of 0.4 to 6.0 g/10 min as determined at 190° C. and a vinyl alcohol content of 40 to 80 mole % and (ii) a low-molecular-weight olefin/vinyl alcohol copolymer having a melt flow rate of 3.0 to 60 g/10 min as determined at 190° C., which is higher by at least 0.5 g/10 min than that of the high-molecular-weight ethylene/vinyl alcohol copolymer (i), and a vinyl alcohol content of 45 to 85 mole % at a weight ratio of from 98/2 to 40/60, and injecting the melt-kneaded composition into a mold through an orifice.

9 Claims, 5 Drawing Sheets

RETENTION TIME

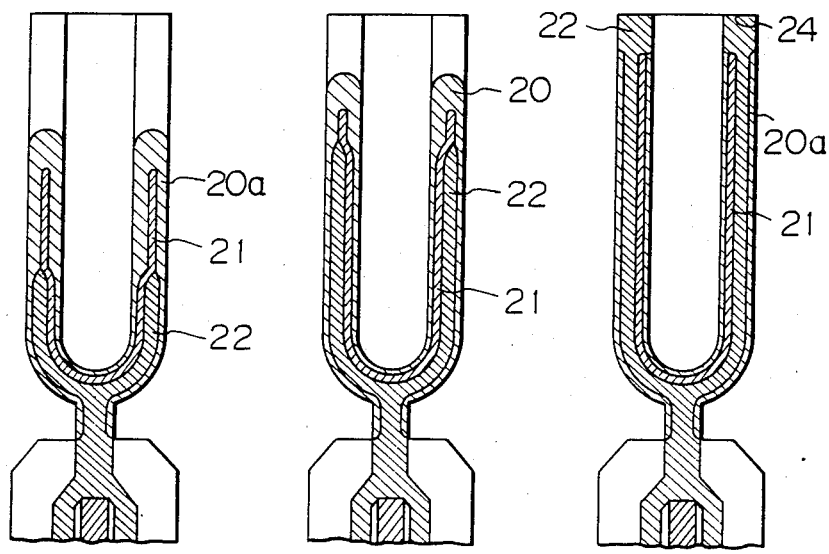

INJECTION-MOLDED BODY OF OLEFIN/VINYL ALCOHOL COPOLYMER AND PROCESS FOR PREPARATION THEREOF

This is a division of application Ser. No. 07/032,646, filed Mar. 31, 1987, U.S. Pat. No. 4,798,697.

BACKGROUND OF THE INVENTION (1) Field of the Invention

The present invention relates to an injection-molded body of an olefin/vinyl alcohol copolymer having such a high molecular weight as not attainable by the conventional techniques and hence, being excellent in various characteristics, and a process for the preparation thereof.

(2) Description of the Prior Art

It is known that olefin/vinyl alcohol copolymers represented by ethylene/vinyl alcohol copolymers are thermoplastic polymers which can be melt-extruded and are excellent in the gas barrier properties, as disclosed in the specification of U.S. Pat. No. 3,419,645.

It also is known that by utilizing these characteristics, an olefin/vinyl alcohol copolymer is used in the form of a single layer or a laminate with other resin layer for imparting gas barrier properties to a packaging material such as a packaging vessel or film, and many proposals have been made in this field.

The extrusion molding method and injection molding method are generally adopted for forming olefin/vinyl alcohol copolymers into packaging materials, and in the production of a packaging material having a multi-layer structure, there are adopted a method in which extruders are used in the number corresponding to the number of kinds of resins used and the resins are co-extruded through a multi-layer multi-ply die, and a method in which injection machines are used in the number corresponding to the number of kinds of resins used and the resins are injected into an injection mold sequentially or simultaneously.

For an ethylene/vinyl alcohol copolymer, there is a suitable range of the molecular weight according to the molding method. For example, in case of injection molding, in view of the melt flowability and the precision of a molded article, the weight average molecular weight (Mw) is relatively low and in the range of from 11,000 to 59,000 (corresponding to the melt flow rate of 3.0 to 60 g/10 min), and in case of extrusion molding for obtaining a blow-formed vessel, in order to attain a good shape-retaining property and prevent thickness unevenness in a parison, the weight average molecular weight is relatively high and generally in the range of 53,000 to 78,000 (corresponding to the melt flow rate of 0.4 to 6.0 g/10 min).

Japanese Patent Application Laid-Open No. 189407/85 or No. 193614/85 discloses a technique of preparing a multi-layer structure comprising a layer of an ethylene/vinyl alcohol copolymer as the intermediate layer by injection molding, but the ethylene/vinyl alcohol copolymer used in this technique has a low molecular weight.

It seems strange that an ethylene/vinyl alcohol copolymer having a high molecular weight, for example, a weight average molecular weight (Mw) higher than 80,000, especially higher than 90,000, has not been used. It is considered that the reason is that an ethylene/vinyl alcohol copolymer having such a high molecular weight involves difficulties in the polymerization operation, the saponification operation and the yields at these steps and molding of the ethylene/vinyl alcohol copolymer having such a high molecular weight is difficult.

In general, the physical properties of a thermoplastic polymer are greatly influenced by the molecular weight, and it is known that such properties as tensile strength, impact strength, creep resistance and rigidity are improved as the molecular weight is increased. Also in an ethylene/vinyl alcohol copolymer, it is expected that increase of the molecular weight will result in improvement of the foregoing characteristics.

SUMMARY OF THE INVENTION

To our great surprise, it was found that if a plurality of olefin/vinyl alcohol copolymers are selected and combined under specific conditions and they are melt-kneaded and injected into an injection mold through an orifice, an injection-molded body including a layer of an olefin/vinyl alcohol copolymer having a very high molecular weight can be obtained. We have now completed the present invention based on this finding.

It is therefore a primary object of the present invention to provide an injection-molded body comprising an olefin/vinyl alcohol copolymer having a weight average molecular weight of at least 80,000, the production of which is impossible according to the conventional injection molding method, and a process for the preparation thereof.

Another object of the present invention is to provide an injection-molded body of an olefin/vinyl alcohol copolymer in which such properties as tensile strength, impact strength, creep resistance and rigidity are improved, and a process for the preparation thereof.

Still another object of the present invention is to provide a process in which an injection-molded body of an olefin/vinyl alcohol copolymer, as described above, can be prepared at a high molding efficiency with ease.

A further object of the present invention is to provide an injection molding process which is easily applied to the multi-layer injection molding of a creep-resistant thermoplastic resin and an olefin/vinyl alcohol copolymer and in which the thickness distribution of the layer of this copolymer can be uniformly controlled.

In accordance with the present invention, there is provided a process for the preparation of an injection-molded body of an olefin/vinyl alcohol copolymer, which comprises melt-kneading in the presence or absence of a radical generator a composition comprising (i) a high-molecular-weight olefin/vinyl alcohol copolymer having a melt flow rate of 0.4 to 6.0 g/10 min as determined at 190° C. and a vinyl alcohol content of 40 to 80 mole % and (ii) a low-molecular-weight olefin/vinyl alcohol copolymer having a melt flow rate of 3.0 to 60 g/10 min as determined at 190° C., which is higher by at least 0.5 g/10 min than that of the high-molecular-weight ethylene/vinyl alcohol copolymer (i), and a vinyl alcohol content of 45 to 85 mole % at a weight ratio of from 98/2 to 40/60, and injecting the melt-kneaded composition into a mold through a nozzle to form in situ a layer of an olefin/vinyl alcohol copolymer having an increased molecular weight and a weight average molecular weight (Mw) of at least 80,000.

According to this process, there can be obtained an injection-molded body of an ethylene/vinyl alcohol copolymer having a weight average molecular weight (Mw) of at least 80,000 and a molecular weight distribution (Mw/Mn) of at least 2.1.

This process is advantageously applied to the co-injection molding with a creep-resistant thermoplastic resin, and in this case, there is obtained a multi-layer injection-molded body comprising inner and outer layers of a creep-resistant thermoplastic resin and an intermediate layer of an olefin/vinyl alcohol copolymer, in which the olefin/vinyl alcohol copolymer constituting the intermediate layer has a weight average molecular weight (Mw) of at least 80,000 and a molecular weight distribution (Mw/Mn) of at least 2.1.

Figure 1:
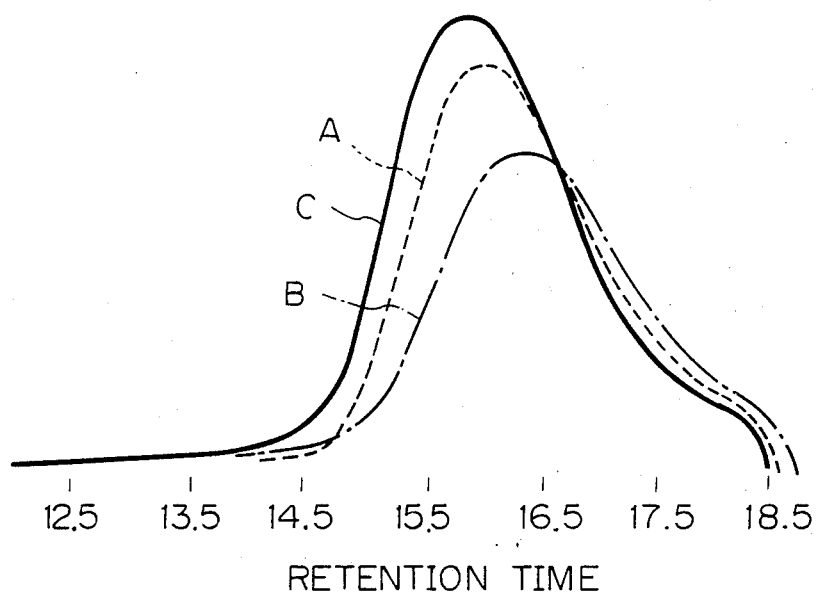
FIG. 1 is a graph showing the molecular weight distributions of injection-molded bodies of high-molecular-weight and low-molecular-weight ethylene/vinyl alcohol copolymers used as the starting materials in the present invention and a blend thereof, in which the retention time is plotted on the abscissa.

In the drawings, reference numeral 1 represents an injection mold, reference numeral 2 represents a core mold, each of reference numerals 7 and 8 represents an injecting machine, each of reference numerals 13 and 14 represents a hot runner, reference numeral 20 represents a polyester, and reference numeral 21 represents an ethylene/vinyl alcohol copolymer.

DETAILED DESCRIPTION OF THE PREFERRED EMBODIMENTS

As pointed out hereinbefore, the present invention is based on the novel finding that if a plurality of olefin/vinyl alcohol copolymers (sometimes referred to as "EVOH") (i) and (ii) as described above are melt-kneaded and injected through a nozzle under high shearing conditions, the molecular weight is prominently increased in EVOH of the resulting injection-molded body.

FIG. 1 of the accompanying drawings shows gel permeation chromatograms of EVOH's determined according to the molecular weight measuring method described below. Namely, in FIG. 1, curves A, B and C are chromatograms of molded bodies obtained by melt-kneading and injection-molding starting EVOH (i), starting EVOH (ii) and a composition comprising EVOH's (i) and (ii) at a weight ratio of 80/20 (described in detail in Example 1 given hereinafter).

Table 1 shows the weight average molecular weights (Mw), number average molecular weights (Mn) and molecular weight distributions (Mw/Mn) calculated from the chromatograms of FIG. 1.

TABLE 1

| EVOH | Mw | Mn | Mw/Mn | Remarks |
|---|---|---|---|---|
| A | 72700 | 35700 | 2.04 | starting EVOH (i), MFR = 1.1 g/10 min |
| B | 56700 | 28200 | 2.01 | starting EVOH (ii), MFR = 15.0 g/10 min |
| C | 113600 | 49500 | 2.29 | intermediate layer of A/B mixture of 80/20 |

Method of Measurement of Molecular Weight of EVOH

At the present, the measurement of the molecular weight of an ethylene/vinyl alcohol copolymer by the gel permeation chromatography is carried out by using a so-called polystyrene gel of the polystyrene-divinylbenzene type in dimethylformamide (DMF) as the solvent at a column temperature of about 130° C. Although DMF is not an excellent solvent for an EVOH copolymer, DMF has to be used because the solubility of polystyrene, which is a reference substance for determination of the molecular weight, in DMF is good. It has now been found that a mixed solvent comprising dimethylsulfoxide (DMSO) and o-dichlorobenzene (ODCB) at a volume ratio of 70/30 is excellent as the solvent for the gel permeation chromatography for determination of the molecular weight of EVOH because the mixed solvent shows a good dissolving power to either EVOH or polystyrene as the reference substance for the determination of the molecular weight. If the mixed solvent is used, the molecular weights of EVOH having a high ethylene content and EVOH having a low ethylene content can be determined and reference polystyrene having a molecular weight of the order of $10^2$ to $10^6$ can be used. Moreover, a column temperature of up to 150° C. is sufficiently adopted. Preferred measurement conditions are described below.

Apparatus: ALC/GPC Model 150° C. supplied by WATER ASSOCIATES

Column: AD-80 M supplied by Showa Denko, 50 cm in length, one column

Solvent: 30 v/v % ODCB-mixed DMSO, flow rate=0.5 ml/min

Temperature: 130° C. for column, 120° C. for auto-injector, detector temperature being the same as column temperature Detector: Model RI Injection quantity: 10 mg of EVOH sample dissolved in 3 ml of solvent (about 0.33% by weight)

Molecular weight reference: polystyrenes of MW of $10^3$ to $10^6$, supplied by Toyo Soda Measurement region: $10^3$ to $10^6$ as molecular weight of polystyrene, Mw, Mn and Mz being calculated according to known methods The surprising fact that the molecular weight of EVOH of the injection-molded body according to the present invention is much higher than that of starting EVOH is apparent from the results shown in FIG. 1 and Table 1. Moreover, from the chromatograms of FIG. 1, it is seen that skirts on the low molecular weight side, observed in starting EVOH's (i) and (ii), disappear and the molecular weight shifts to the high molecular weight side. This fact is well in agreement with the fact that although EVOH's differing greatly in the molecular weight are used in combination as the starting material, the molecular weight distribution (Mw/Mn) is broadened only very slightly as compared with that of starting EVOH. These facts indicate that according to the injection molding process of the present invention, block copolymerization and/or graft polymerization is caused between starting EVOH (i) and EVOH (ii).

In general, when two kinds of polymers are kneaded in the absence of a free radical acceptor, formed polymer radicals react randomly, and there is formed a mixture of (1) starting polymer molecules, (2) block polymers of the two polymers, (3) graft polymers by radical transfer reaction, (4) degraded polymers and (5)

crosslinked block and graft polymer (see, for example, W. J. Burland and A. S. Hoffman, BLOCK AND GRAFT COPOLYMER, Reinhold Publishing Corporation, 1960). It is said that it is difficult to separate and fix pure polymers from this mixture.

In contrast, according to the process of the present invention, degraded polymers (4) are hardly formed but blocking and grafting (5) are caused effectively and relatively uniformly. The reason has not been precisely clarified, but it is believed that this is due to the fact that formation of polymer radicals and intimate mixing of polymers are uniformly carried out and the polymer mixture is fixed by rapid cooling in the injection mold.

It has not been confirmed what crosslinking structures would be formed. However, there can be considered (a) crosslinking of ethylene chain portions

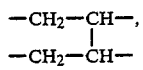

(b) crosslinking of vinyl alcohol chain portions

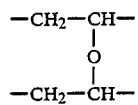

and (c) a combination thereof.

Starting Ethylene/Vinyl Alcohol Copolymers

Of the ethylene/vinyl alcohol copolymer blend used in the present invention, the above-mentioned copolymer (i) is ordinarily available as a copolymer of the extrusion molding grade, and in general, the metal flow rate (MFR) is 0.4 to 6.0 g/10 min (as measured at 190° C.) and the vinyl alcohol content is 40 to 80 mole %. The weight average molecular weight is ordinarily 53,000 to 78,000 and especially 59,000 to 76,000, and the molecular weight distribution (Mw/Mn) is ordinarily in the range of from 1.5 to 3. This component (i) may be single EVOH or it may be a mixture of two or more of EVOH's, so far as the above conditions are satisfied.

The above-mentioned copolymer (ii) is ordinarily available as a copolymer of the injection molding grade, and in general, the melt flow rate (MFR) is 3.0 to 60 g/10 min (as measured at 190° C.), which is higher by at least 0.5 g/10 min than that of the high-molecular-weight copolymer (i), and a vinyl alcohol content of 45 to 85 mole %. The weight average molecular weight is ordinarily 11,000 to 59,000 and especially 15,000 to 58,000, and the molecular weight distribution (Mw/Mn) is in the range of from 1.5 to 3. The component (ii) may be single EVOH, or it may be a mixture of two or more of EVOH's.

In these EVOH's, if the vinyl alcohol content is lower than 40 mole %, the gas barrier properties are lower than those of the copolymer having a vinyl alcohol content within the above-mentioned range. If the vinyl alcohol content is higher than 85 mole %, the injection moldability is reduced and the tendency of thermal decomposition is increased at the molding step. If MFR of the component (i) is too small and below the above-mentioned range, the injection moldability is reduced, and if MFR of the component (i) is too large and exceeds the above range, the molecular weight-increasing effect by injection is lower than the effect attained when MFR is within the range specified in the present invention. It also is important from the viewpoint of the injection moldability that MFR of the component (ii) should be within the above-mentioned range, and if MFR of the component (ii) is too small and below the above range, the melt flowability is reduced.

Moreover, in the present invention, it is important that high-molecular-weight EVOH (i) and low-molecular-weight EVOH (ii) should be mixed at a weight ratio of from 98/2 to 40/60, especially from 95/5 to 50/50. This mixing ratio has influences on both the molecular weight of the final injection-molded body and the injection moldability. If the amount of the component (i) exceeds the above range, the injection moldability is reduced, and if the amount of the component (i) is too small and below the above range, the degree of increase of the molecular weight of the EVOH layer of the final injection-molded body is low, and the above-mentioned advantages of the present invention are not attained.

Lamination Resin

In the present invention, the above-mentioned EVOH blend alone may be injection-molded to form a vessel or a preform for a vessel. However, it is generally preferred that the EVOH blend and other thermoplastic resin be simultaneously or sequentially co-injected to form an injection-molded body having a multi-layer structure. In this case, the EVOH layer can be a gas barrier layer and the other resin can be a substrate layer. It is preferable to adopt a layer structure in which EVOH is an intermediate layer and the other resin constitutes inner and outer layers.

As the other thermoplastic resin, there are advantageously used moisture-resistant resins having a water absorption lower than 2.5% as determined according to ASTM D-570, such as an olefin resin, a thermoplastic polyester resin, a thermoplastic polyamide resin, a polycarbonate resin, a polymethacrylic resin and a styrene resin.

Since the multi-layer injection-molded body of the present invention is especially valuable as a preform for the production of a vessel having vessel wall molecularly oriented in at least one direction by the solid phase molding method such as draw-blow forming, plug-assist forming or stretch forming, it is preferred that the thermoplastic resin to be used in combination with the thermoplastic resin be a resin excellent in the creep resistance, for example, a creep-resistant olefin resin such as polypropylene, a propylene/ethylene copolymer, polybutene-1, a propylene/butene-1 copolymer or poly-4-methyl-pentene-1, a thermoplastic polyester such as polyethylene terephthalate, polybutylene terephthalate or polyethylene terephthalate/isophthalate, a polycarbonate resin, a polymethacrylic resin or a polystyrene resin.

Injection Molding

In the present invention, the high-molecular-weight olefin/vinyl alcohol copolymer (i) and the low-molecular-weight olefin/vinyl alcohol (ii) is melt-kneaded by a uniaxial extruder, a biaxial extruder, a Banbury mixer or a roll kneader, pelletized, supplied into a hopper of an injection molding machine and subjected to injection molding. Alternatively, the copolymers (i) and (ii) are dry-blended by a blender or a Henschel mixer, supplied into a hopper of an injection molding machine and subjected to injection molding.

At the melt-kneading step, in order to promote increase of the molecular weight of EVOH, a known radical generator may be incorporated into the EVOH blend in a known amount, though incorporation of the radical generator is not particularly necessary.

As the radical generator, there can be used organic peroxides and organic peresters such as benzoyl peroxide, dichlorobenzoyl peroxide, dicumyl peroxide, di-tert-butyl peroxide, 2,5-di(peroxidobenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl sec-octoate, tert-butyl perpivalate and tert-butyl perdiethylacetate. Furthermore, azo compounds such as azobisisobutyronitrile and dimethylazoisobutyronitrile can be used.

As the injection molding machine, there can be used various molding machines such as a plunger type molding machine, a screw propeller type molding machine and an in-line screw type molding machine. As the clamping machine, there may be used a direct pressure type clamping machine, a toggle type clamping machine and a wedge type clamping machine.

The injection molding conditions are not particularly critical, but a cylinder temperature of 190° to 310° C., especially 200° to 290° C., and an injection pressure of 30 to 150 kg/cm$^2$ (gauge), especially 40 to 130 kg/cm$^2$, are preferred for the EVOH blend. It is preferred that the mold temperature be 0° to 160° C., especially 5° to 150° C.

In preparing a multi-layer injection-molded body, an injection molding machine for the EVOH blend and an injection molding machine for the other thermoplastic resin are used, and both the resins are simultaneously or sequentially injected into a mold through a multi-layer multi-ply nozzle.

The multi-layer injection process will now be described with reference to an embodiment shown in FIGS. 2 through 4-I, in which polyethylene terephthalate (PET) is used as the creep-resistant thermoplastic resin.

Figure 2:
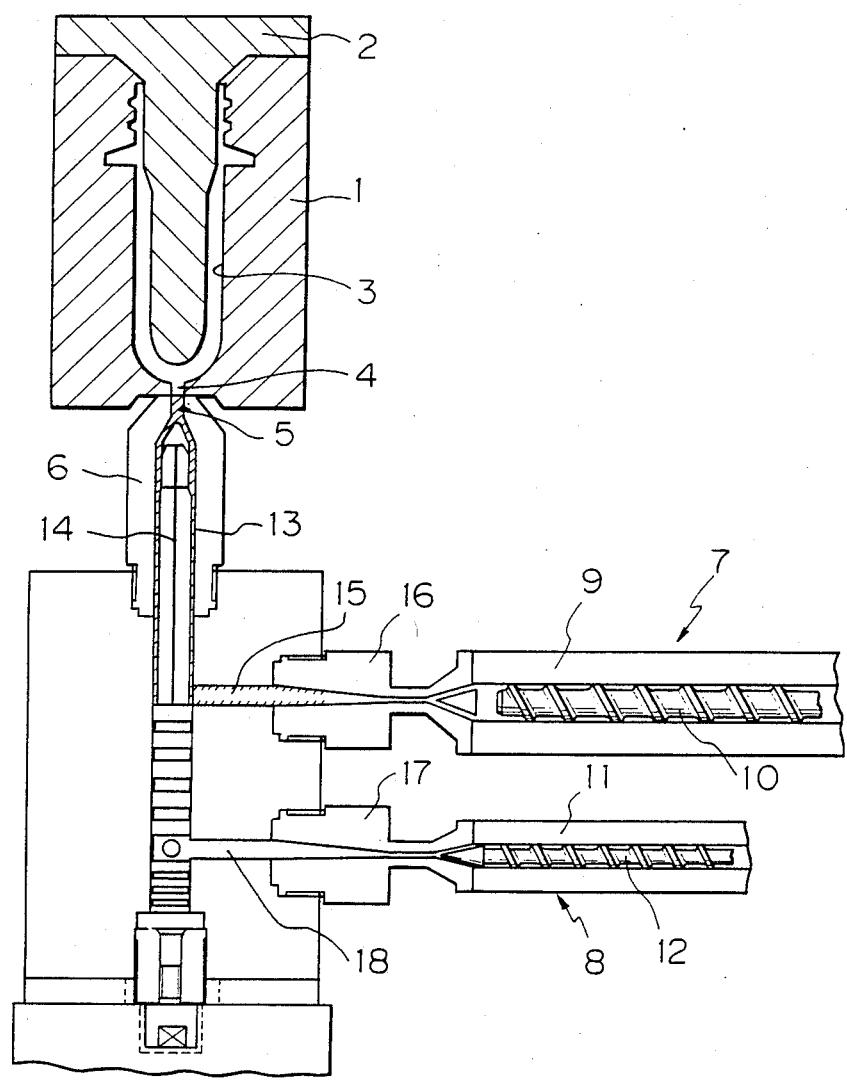
FIG. 2 is a schematic arrangement view of a co-injection molding machine used in carrying out the present invention.

Referring to FIG. 2 illustrating a co-injection apparatus used for the production of a multi-layer preform, a cavity 3 corresponding to the preform is formed between an injection mold 1 and a core mold 2. A gate 4 is arranged in the mold 1 at the position corresponding to the bottom of the preform, and the gate 4 is connected to two injecting machines 7 and 8 through a hot runner nozzle 5 and a hot runner block 6. The main injecting machine 7 is for injection of a polyester and is provided with a barrel 9 and a screw 10 arranged in the interior thereof. The subsidiary injecting machine 8 is for injection of the ethylene/vinyl alcohol copolymer blend and is provided with a barrel 11 and a screw 12 arranged in the interior thereof. In the block 6 and nozzle 5, there are disposed a hot runner 13 for injection of the polyester, which has an annular section, and a hot runner 14 for injection of the ethylene/vinyl alcohol copolymer blend, which is located at the center of the hot runner 13. The hot runners 13 and 14 are arranged so that they are coaxial with each other and join together in the vicinity of the top end of the nozzle 5. A polyester-injecting sprue 15 is connected to the hot runner 13 through a sprue bush 16, and an ethylene/vinyl alcohol copolymer blend-injecting sprue 18 is connected to the hot runner 14 through a sprue bush 17.

The resin to be injected is molten in the barrel 9 (11) and held in the barrel 9 (11) by rotation of the screw 10 (12), and the screw 10 (12) is advanced and the molten resin is injected into the cavity 3 through the sprue 15 (18), the hot runner 13 (14) and the gage 4. According to the present invention, injection of the polyester an the ethylene/vinyl alcohol copolymer is carried out under the following conditions.

Figure 3:
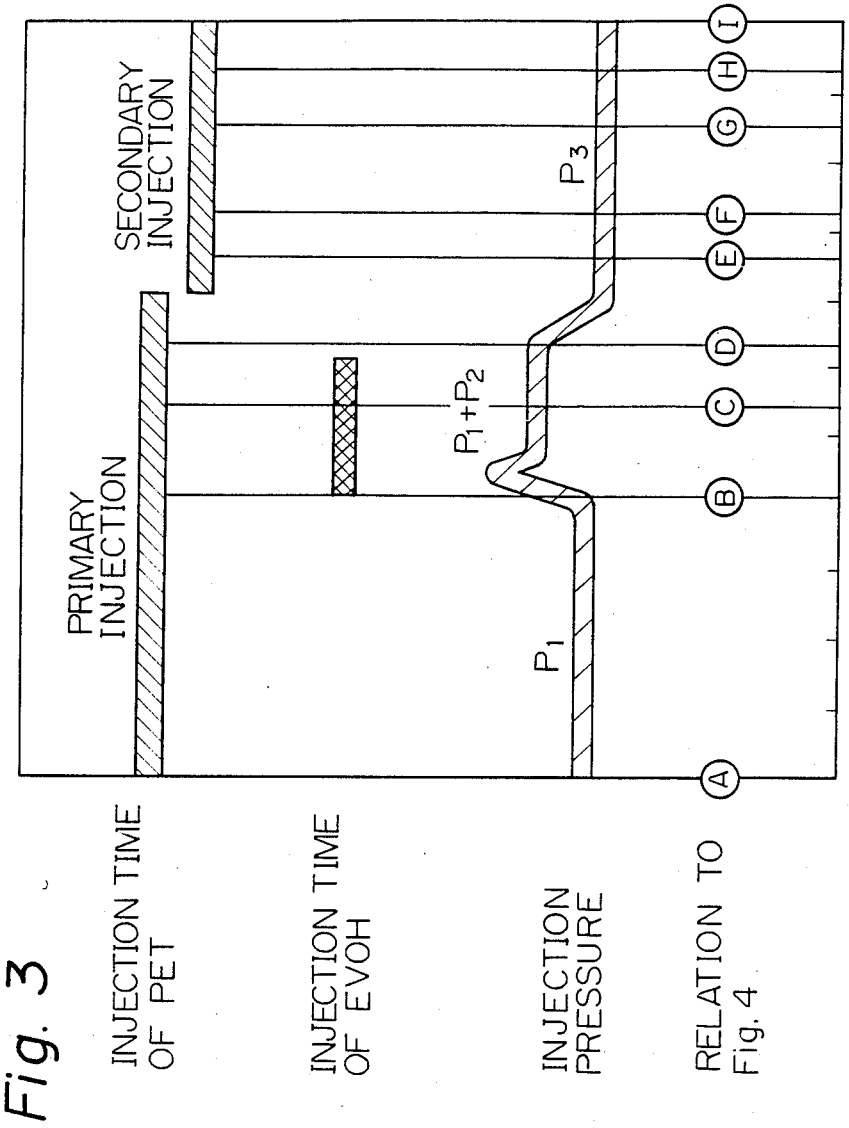
FIG. 3 is a time chart illustrating the relation between the injection time and the injection pressure.
Figure 4:
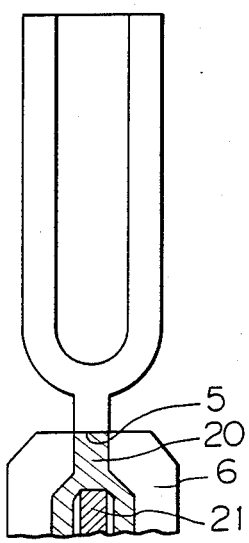
FIGS. 4-A through 4-I are diagrams illustrating the injection state relative to FIG. 3.
Figure 4:
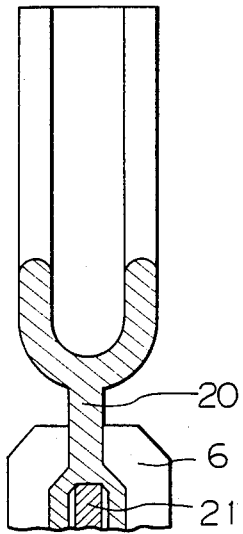
Figure 4:
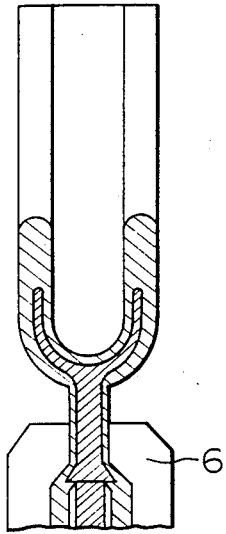
Figure 4:
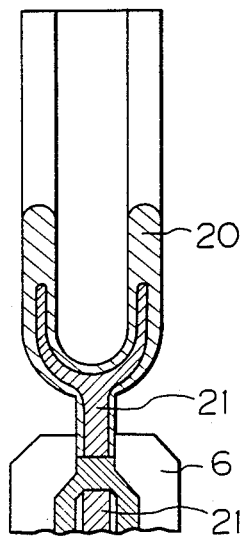
Figure 4:
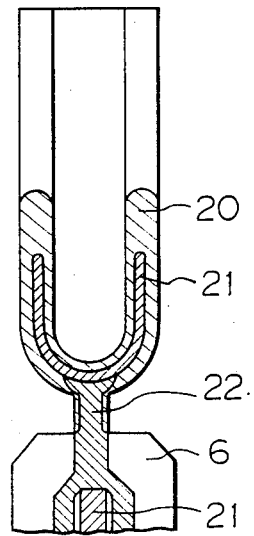
Figure 4:
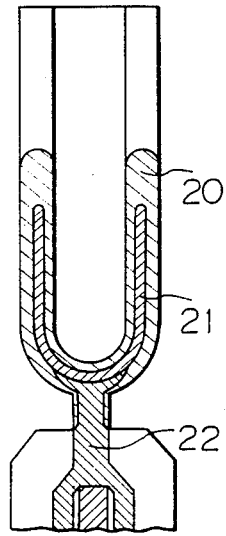

Referring to FIG. 3 illustrating the relation between the polyester (PET) and the ethylene/vinyl alcohol copolymer blend (EVOH), alphabetic symbols A through I correspond to FIGS. 4-A through 4-I.

At first, the polyester-injecting screw 10 is advanced and primary injection is carried out in the cavity 3 under a certain pressure. FIG. 4-A illustrates the state just before injection of the polyester, and the polyester is present in the top end portion of the nozzle 5, but the ethylene/vinyl alcohol copolymer blend 21 is still kept in the top end of the hot runner 14. With injection of the polyester, as shown in FIG. 4-B, the primarily injected polyester 20 fills the cavity 3 to the midway.

When a predetermined amount of the polyester is injected, that is, at the point of the lapse of time t1, the screw 12 for injection of the ethylene/vinyl alcohol copolymer blend is advanced and the ethylene/vinyl alcohol copolymer blend 21 is injected into the cavity 3. In this case, as shown in FIG. 4-C, in the surface portion of the cavity 3, the primarily injected polyester 20 is solidified by the contact with the mold, or even if the polyester 20 is not solidified, the viscosity is extremely increased. Accordingly, the injected ethylene/vinyl alcohol copolymer blend 21 flows toward the top end of the cavity 3 substantially along the central face of the polyester-filled layer, and by the above-mentioned function, an intermediate layer of the copolymer having an increased molecular weight is formed.

At time t2 of completion of the injection of the ethylene/vinyl alcohol copolymer blend, the remainder of the polyester is injected (secondary injection). FIG. 4-D illustrates the state of termination of the injection of the ethylene/vinyl alcohol copolymer blend, and FIG. 4-E illustrates the initial stage of the secondary injection of the polyester in the cavity.

As shown in FIGS. 4-F and 4-G, the secondarily injected polyester 22 flows between the outer surface of the polyester layer 20a on the cavity side and the ethylene/vinyl alcohol copolymer layer 21 to press the ethylene/vinyl alcohol copolymer layer 21 to the inner face side of the cavity. This secondarily injected polyester 22 is advanced toward the top end of the cavity between the ethylene/vinyl alcohol copolymer layer 21 and the outer face layer 20a of the primarily injected polyester while elongating the ethylene/vinyl alcohol copolymer layer in a substantially uniform thickness toward the top end of the cavity.

Advance of the secondarily injected polyester 22 and elongation of the ethylene/vinyl alcohol copolymer layer 21 are conducted to the vicinity of the top end of the cavity 3, as shown in FIG. 4-H. At the terminal stage of the secondary injection, that is, at time t3, as shown in FIG. 4-I, the secondarily injected polyester 22 arrives at the top end 24 of the cavity, and the injection cycle is completed.

In the process of the present invention, since EVOH is injected in the form of a blend having a relatively low average molecular weight, the melt viscosity is controlled to a low level and the operation adaptability to injection molding is improved. This is one advantage attained by the present invention.

Moreover, according to the present invention, as shown in the examples given hereinafter, the thickness unevenness in the ethylene/vinyl alcohol copolymer layer 21 can be prevented and an intermediate layer having a uniform thickness from the bottom to the open end can be formed. This is another prominent advantage attained by the present invention.

In this embodiment of the present invention, it was found that the primary injection pressure P1 of the polyester, the injection pressure P2 of the ethylene/vinyl alcohol copolymer and the secondary injection pressure P3 of the polyester can be changed within a considerably broad range.

Generally speaking, in order to form a completely continuous phase of the ethylene/vinyl alcohol copolymer, it is preferred that the injection pressure P2 of the ethylene/vinyl alcohol copolymer be higher than the primary injection pressure P1 of the polyester. It has been found that even if the secondary injection pressure P3 of the polyester is considerably lower than the primary injection pressure P1 of the polyester, satisfactory results can be obtained.

Preferred pressures P1, P2 and P3 are as follows.
P1: 60 to 80 kg/cm$^2$ (gauge)
P2: 80 to 130 kg/cm$^2$ (gauge), 1.2 to 1.8 times the pressure P1
P3: 30 to 70 kg/cm$^2$ (gauge), 0.5 to 0.8 times the pressure P1

Injection-Molded Body

In the injection-molded body of EVOH according to the present invention, the EVOH layer has such a high molecular weight as not attainable in conventional injection-molded bodies, that is, a weight average molecular weight of at least 80,000, preferably at least 90,000, especially preferably at least 100,000, and the molecular weight distribution (Mw/Mn) is at least 2.1.

In this injection-molded body, mechanical properties such as tensile strength, elastic modulus, impact resistance, creep resistance and rigidity can be prominently improved, and when the injection-molded body is contacted as the packaging material with the content, the extraction resistance is highly improved.

In the multi-layer injection-molded body of the present invention comprising inner and outer layers of a creep-resistant thermoplastic resin and an intermediate layer of EVOH, the weight average molecular weight (Mw) and molecular weight distribution (Mw/Mn) of the EVOH layer are within the above-mentioned range, and the thickness of the EVOH layer can be controlled to such a small value as 20 to 200 $\mu$m, according to need. Moreover, in this EVOH layer, the variation coefficient (see Example 6 given hereinafter) indicating the deviation of the thickness can be controlled below 30%, especially below 20%.

More specifically, when a multi-layer structure is formed by co-injection of EVOH and other resin, the EVOH layer is influenced by the injection pressure of the other resin, and EVOH is caused to flow in the vicinity of the gate of the injection mold and the thickness is reduced while the thickness is increased on the side opposite to the gate.

As is apparent from Example 6 given hereinafter, in the conventional injection-molded body of EVOH, the thickness of EVOH layer is about 20 $\mu$m at largest and the variation coefficient is much larger than 30%.

In the present invention, prominent increase of the molecular weight is caused in the injection mold, reduction of the thickness of the EVOH layer by flowing in the vicinity of the gate is not caused and the above-mentioned thickness unevenness is not caused. Therefore, a multi-layer injection-molded body provided with an EVOH layer having a uniform large thickness can be obtained according to the present invention.

The injection-molded body of the present invention is valuable as a vessel, a vessel lid or a preform for formation of a vessel.

For example, if a preform as shown in FIGS. 2 through 4-I is pre-heated at a polyester-drawing temperature, for example, 85° to 115° C., stretch-drawn at a draw ratio of 1.5 to 4 in the axial direction and expand-drawn at a draw ratio of 2 to 6 in the circumferential direction by blowing a fluid, a plastic bottle having the vessel wall molecularly oriented in two directions can be obtained.

The present invention will now be described in detail with reference to the following examples that by no means limit the scope of the invention.

EXAMPLE 1

Polyethylene terephthalate (PET) having an inherent viscosity of 0.75 was supplied to a main injecting machine and a dry blend comprising (i) an ethylene/vinyl alcohol copolymer (EVOH-A) having a vinyl alcohol content of 70 mole % and a melt flow rate of 1.1 g/10 min and (ii) an ethylene/vinyl alcohol copolymer (EVOH-B) having a vinyl alcohol content of 70 mole % and a melt flow rate of 15.0 g/10 min at an (EVOH-A)/(EVOH-B) mixing weight ratio of 80/20 was supplied to a subsidiary injecting machine.

Molten PET was primarily injected under a pressure of about 60 kg/cm$^2$ at a temperature of 280° C. from the main injecting machine, and after the lapse of about 1.4 seconds, the molten EVOH blend was injected under an injection pressure of about 100 kg/cm$^2$ at 270° C. for 0.8 second from the subsidiary injecting machine. Subsequently, PET was secondarily injected under a pressure of about 30 kg/cm$^2$ to obtain a two-resin three-layer preform having a total thickness of about 4.4 mm.

The temperature of this high-temperature preform was adjusted to about 105° C. at a second station and the preform was biaxially drawn at draw ratios of 2.0 in the longitudinal direction and 3.0 in the lateral direction at a third station and was then cooled to obtain a cylindrical multi-layer bottle having an inner volume of 1000 ml.

The weight of the obtained three-layer bottle was 55.5 g, and the average thickness of the outer later (PET) of the multi-layer bottle was about 0.5 mm, the average thickness of the intermediate layer (the above-mentioned EVOH mixture, designated as "EVOH-C") was about 0.03 mm and the average thickness of the inner layer (PET) was about 0.2 mm.

The intermediate layer (EVOH-C) of the formed multi-layer bottle was peeled and sampled, and the molecular weight distribution of EVOH-C was determined by the gel permeation chromatography according to the method described hereinbefore. Moreover, the molecular weight distributions of EVOH-A and EVOH-B were similarly determined.

The obtained results are shown in FIG. 1 and Table 1.

From these results, it is seen that the molecular weight distribution curve (curve C), that is, Mw/Mn, of the intermediate layer (EVOH-C) of the multi-layer bottle formed by heat-kneading the dry blend of EVOH-A and EVOH-B (80/20 weight ratio) and injecting the melt under high shearing conditions through a nozzle by the subsidiary injecting machine, is not substantially expanded as compared with the molecular weight distribution curves (curves A and B) of EVOH-A and EVOH-B which had not undergone such heat history, and in curve C, the molecular weight is apparently shifted to the higher side than in curves B and C. Moreover, from Table 1, it is seen that both of the weight average molecular weight (Mw) and the number average molecular weight (Mn) of EVOH-C are definitely higher than those of EVOH-A AND EVOH-C and the molecular weight of EVOH-C is increased.

For example, a multi-layer bottle having a layer structure of PET/EVOH-C/PET was formed according to the process disclosed in Japanese Patent Application Laid-Open Specification No. 60436/86 (co-extrusion/biaxial draw-blow forming), and the molecular weight distribution of the intermediate layer (EVOH-C) of the bottle was determined by the gel permeation chromatography.

The obtained chromatogram was substantially in agreement with curve A, and the obtained weight average molecular weight (Mw) was 70,100 and the number average molecular weight (Mn) was 31,300 (Mw/Mn=2.24).

EXAMPLE 2

With respect to the two-resin three-layer bottle of the PET/EVOH-C/PET structure obtained by the multilayer injection/biaxial draw-blow forming process described in Example 1 [bottle weight=55.5 g, inner volume=1000 ml, outer layer (PET) thickness=0.5 mm, intermediate layer (EVOH-C) thickness=0.03 mm, inner layer (PET) thickness=0.2 mm; hereinafter referred to as "bottle I"] and the comparative two-resin three-layer bottle of the PET/EVOH-C/PET structure formed according to the multi-layer co-extrusion/biaxial draw-blow forming process disclosed in Japanese Patent Application Laid-Open Specification No. 60436/86 as described in Example 1 (the shape, weight and layer thicknesses were the same as those of bottle I; hereinafter referred to as "bottle E"), the falling shock test and oxygen permeability test were carried out according to the following procedures.

(i) Falling Shock Test

Ten samples each of bottle I and bottle E were fully filled with service water (1000 ml), and the mouth portion of each sample was capped and each sample was stored in a refrigerating room maintained at 5° C. for 7 days. Then, the falling shock test was carried out in the refrigerating room. Namely, ten samples of each bottle were let to fall down so that the bottoms of the samples impinged against on the floor surface (concrete surface) of the refrigerating room (vertical dropping method). The falling height was 2.0 m. with respect to each sample, the falling test was conducted 10 times at most. At each falling test, it was checked with the naked eye whether or not the sample bottle was broken or whether not interlaminar peeling was caused.

In case of bottle I obtained by co-injection, in any of the ten samples, breaking or peeling (delamination) was not caused at any of the ten tests.

In contrast, in case of bottle E obtained by co-extrusion, one sample was broken at each of the fifth, seventh, eighth and ninth falling tests and three samples were broken at the tenth falling test. Moreover, at the first falling test, delamination was caused in all of the ten samples.

(ii) Oxygen Permeability

According to the equilibrium pressure/gas chromatogram method disclosed in Japanese Patent Publication No. 42493/82, the oxygen permeability was determined with respect to five samples each of bottle I and bottle E. All the samples were stored for 3 weeks in a thermostat tank maintained at a temperature of 37° C. and a relative humidity of 20%. The concentration of oxygen which had permeated into the sample bottle was determined by the gas chromatograph, and the oxygen permeability was calculated according to the calculation equation.

The oxygen permeability of bottle I was 2.2 cc/$m^2$·day·atm as the mean value of the five samples.

In contrast, the oxygen permeability of bottle E was 4.8 cc/$m^2$·day·atm as the mean value of the five samples.

For comparison, the oxygen permeability of a PET single layer bottle (the shape and weight were the same as those of bottles I and E) measured in the same manner as described above was 5.9 cc/$m^2$·day·atm as the mean value of the five samples.

EXAMPLE 3

To 100 parts by weight of a mixture comprising (i) an ethylene/vinyl alcohol copolymer (EVOH-A) having a vinyl alcohol content of 70 mole % and a melt flow rate of 1.1 g/10 min and (ii) an ethylene/vinyl alcohol copolymer having a vinyl alcohol content of 55 mole % and a melt flow rate of 5.5 g/10 min (EVOH-D) at an (EVOH-A)/(EVOH-D) mixing weight ratio of 50/50 was added 1 part by weight of 2,2'-azobisisobutyronitrile, and the mixture was dry-blended.

A cylindrical bottle having a weight of 43.1 g, an inner volume of about 300 cc and an average thickness of about 0.8 mm was formed by using (a) the same injecting machine as the main injecting machine used in Example 1 (Model FS-170N supplied by Nissei Jushi Kogyo), an injection mold and a blow mold or (b) an extruder provided with a full-flight screw having a diameter of 60 mm and an effective length/diameter ratio of 22 and a blow mold. In case of the injection-blowing method (a), the injection pressure of 70 kg/$cm^2$ and the resin temperature was about 210° C. In case of the extrusion-blowing method (b), the resin pressure was 65 kg/$cm^2$ and the resin temperature was about 200° C.

The EVOH blend bottle obtained by injection-blowing is designated as "bottle EVOH-P" and the EVOH blend bottle obtained by extrusion-blowing is designated as "EVOH-Q".

The so-obtained blend bottles EVOH-P and EVOH-Q and the materials EVOH-A and EVOH-D were subjected to the gel permeation chromatography, and the weight average molecular weight (Mw), the number average molecular weight (Mn) and the molecular weight distribution (Mw/Mn) were determined from the obtained molecular weight distribution curves.

The obtained results are shown in Table 2. From these results, it is seen that in the blend bottle EVOH-P obtained by injection-blowing, the weight average molecular weight (Mw) and number average molecular weight (Mn) are higher than those of EVOH-A and EVOH-D as the materials of the blend and prominent increase of the molecular weight is attained.

In contrast, in case of the blend bottle EVOH-Q obtained by extrusion-blowing, the values of the weight average molecular weight (Mw) and number average molecular weight (Mn) are close to those of EVOH-A and EVOH-D and any effect of increasing the molecular weight is not substantially attained.

TABLE 2

| EVOH | Mw | Mn | Mw/Mn | Remarks |
| --- | --- | --- | --- | --- |
| P | 106000 | 50200 | 2.11 | blend bottle by injection-blowing |
| Q | 70300 | 28900 | 2.43 | blend bottle by extrusion-blowing |
| A | 72700 | 35700 | 2.04 | EVOH described in (i) |
| D | 57900 | 28700 | 2.02 | EVOH described in (ii) |

Note
In each blend bottle, the (EVOH-A)/(EVOH-D) mixing weight ratio was 50/50.

EXAMPLE 4

With respect to the blend bottle EVOH-P by injection-blowing and the blend bottle EVOH-Q by extrusion-blowing, described in Example 3, (i) the falling shock test and (ii) the oxygen permeability test were conducted according to the following procedures.

(i) Falling Shock Test

Ten samples each of the blend bottles EVOH-P and EVOH-Q were fully filled with service water (300 ml) and the mouth portions of the samples were capped. The samples were stored in a refrigerating room maintained at 5° C. for 7 days. Then, the falling shock test was conducted in this refrigerating room.

More specifically, ten samples each of the bottles EVOH-P and EVOH-Q were let to fall down so that the bottoms impinged against the floor surface (concrete surface) of the refrigerating room. The falling height was 1.2 mm. The dropping test was conducted 10 times at largest, and at each dropping test, it was checked with the naked eye whether or not the sample was broken or whether or not peeling was caused.

In case of the bottle EVOH-P obtained by injection-blowing, even if the falling test was conducted 10 times, any sample was not broken. On the other hand, in case of the bottle EVOH-Q obtained by extrusion-blowing, six samples were broken at the first falling test, three samples were broken at the second falling test and one sample was broken at the third falling test. Namely, when the falling test was conducted three times, all the samples were broken, and it was confirmed that the effect of improving the falling strength by increase of the molecular weight is prominent in the bottle EVOH-P.

(ii) Oxygen Permeability

According to the method described in Example 2, the oxygen permeability was determined with respect to five samples each of the bottles EVOH-P and EVOH-Q. The storage conditions were the same as described in Example 2.

In case of the bottle EVOH-P, the oxygen permeability was 0.02 cc/m²·day·atm as the mean value of the five samples, and in case of the bottle EVOH-Q, the oxygen permeability was 0.03 cc/m²·day·atm as the mean value of the five samples. No significant difference of the oxygen permeability was observed between the two bottles.

EXAMPLE 5

According to the process disclosed in Japanese Patent Application Laid-Open Specification No. 254325/86, polyethylene terephthalate (PET) described in Example 1 was supplied to the main injecting machine and a dry blend comprising EVOH-A, EVOH-B and EVOH-D described in Examples 1 and 3 at an (EVOH-A)/(EVOH-B)/(EVOH-D) mixing ratio of 50/20/30 was supplied to the subsidiary injecting machine. At first, primary injection of PET from the main injecting machine was carried out for 1.3 seconds under a pressure of about 70 kg/cm² and injection of PET was stopped for 0.1 second. After the lapse of 1.4 seconds from the point of initiation of injection of PET, the molten EVOH mixture was injected under an injection pressure of about 115 kg/cm² for 0.8 second in a predetermined amount (about 7% by weight) from the subsidiary injecting machine. After the lapse of 0.05 second from the point of termination of the injection of the EVOH mixture, PET was injected from the main injecting machine under a pressure (about 65 kg/cm²) lower than the primary injection pressure to obtain a two-resin five-layer preform having a total thickness of 3.8 mm. The weight of the multi-layer preform was 59.2 g, and the inner PET layer/first EVOH layer/intermediate PET layer/second EVOH layer/outer PET layer weight ratio was 22/3/31/4/40.

In a biaxial draw-blow forming machine (Model OBM-1G supplied by Toyo Shokuhin Kikai), the multi-layer preform was heated at 100° C. for 30 seconds and was biaxially draw-blow-formed for 5 seconds in a mold set at 19° C. The draw ratio in the longitudinal (axial) direction was 2.7 and the draw ratio in the lateral (circumferential) direction was 3.8. The weight was 59.2 g. A cylindrical bottle having a full capacity of 1521 ml was thus formed.

The first EVOH layer (hereinafter referred to as "EVOH-V") and the second EVOH layer (hereinafter referred to as "EVOH-W") were peeled and sampled from the formed bottle and the molecular distributions of EVOH-V and EVOH-W were determined by the gel permeation chromatography according to the method described hereinbefore. The weight average molecular weight (Mw), the number average molecular weight (Mn) and the molecular weight distribution (Mw/Mn) were calculated.

The obtained results are shown in Table 3. For comparison, the results of the materials EVOH-A, EVOH-B and EVOH-D are also shown in Table 3.

From the results shown in Table 3, it is seen that even in the EVOH blend layers (EVOH-V and EVOH-W) of the 2-resin 5-layer structure, if heat kneading is carried out in the subsidiary injecting machine and the blend is injected under high shearing conditions through the nozzle, both the weight average molecular weight (Mw) and the number average molecular weight (Mn) are apparently increased over those of the respective materials. That is, a prominent effect of increasing the molecular weight is attained.

The so-obtained two-resin five-layer bottle was subjected to the falling shock test according to the method described in Example 2. The amount of service water filled in each sample bottle was about 1500 ml. Under the falling conditions as adopted in Example 2, no sample bottle was broken among all (10) of the sample bottles. After the tenth falling test, rice grain-like delamination was observed in the vicinity of the bottom corner in one sample bottle, but it was judged that there was no substantial problem.

The oxygen permeability test was conducted on five samples of the two-resin five-layer bottle according to the method described in Example 2.

The oxygen permeability of the two-resin five-layer bottle was $1.4\pm0.2$ cc/m$^2$·day·atm.

For comparison, the oxygen permeability test was similarly carried out on five samples of a PET single layer bottle (the shape and weight were the same as those of the above-mentioned two-resin five-layer bottle). The oxygen permeability of this comparative bottle was $6.1\pm0.3$ cc/m$^2$·day·atm.

TABLE 3

| EVOH | Mw | Mn | Mw/Mn | Remarks |
|------|------|------|-------|---------|
| V | 112400 | 50100 | 2.24 | first EVOH layer (on inner PET layer side) |
| W | 110500 | 50000 | 2.21 | second EVOH layer (on outer PET layer side) |
| A | 72700 | 35700 | 2.04 | EVOH described in Example 1 |
| B | 56700 | 28200 | 2.01 | EVOH described in Example 1 |
| D | 57900 | 28700 | 2.02 | EVOH described in Example 3 |

Note
In each EVOH layer of the two-resin five-layer bottle, the (EVOH-A)/(EVOH-B)/(EVOH-D) mixing weight ratio was 50/20/30.

EXAMPLE 6

Polyethylene terephthalate (PET) having an inherent viscosity of 0.75, described in Example 1, was supplied to a main injecting machine, and (i) an ethylene/vinyl alcohol copolymer (EVOH-A) having a vinyl alcohol content of 70 mole % and a melt flow rate of 1.1 g/10 min or (ii) an ethylene/vinyl alcohol copolymer (EVOH-B) having a vinyl alcohol content of 72 mole % and a melt flow rate of 15.0 g/10 min was supplied to a subsidiary injecting machine. Co-injection and biaxial draw-blowing were carried out under the same conditions as described in Example 1. Thus, there were obtained (iA) a two-resin three-layer bottle having an outer layer/intermediate layer/inner layer structure of PET/(EVOH-A)/PET and (iiB) a two-resin three-layer bottle having an outer layer/intermediate layer/inner layer structure of PET/(EVOH-B)/PET. The multi-layer bottle having an intermediate layer of EVOH-A alone is designated as "bottle A1" and the multi-layer bottle having an intermediate layer of EVOH-B alone is designated as "bottle B1".

The shape of each of the bottles A1 and B1 was the same as in Example 1. Namely, each bottle was a cylindrical multi-layer bottle having a weight of 55.5 g and an inner volume of 1000 ml.

The intermediate layer (EVOH-A1 referred to as "A1" for distinguishing it from starting EVOH-A) of the formed bottle A1 and the intermediate layer (EVOH-B1 referred to as "B1" for distinguishing it from starting EVOH-B) of the formed bottle B1 were peeled and sampled, and the molecular weight distributions of EVOH-A1 and EVOH-B1 were determined by the gel permeation chromatography according to the method described hereinbefore. The number average molecular weight (Mn), the weight average molecular weight (Mw) and the molecular weight distribution (Mw/Mn) were calculated from the obtained molecular distribution curve.

The results are shown in Table 4. For comparison, the results of the blend intermediate layer (EVOH-C) and starting materials (EVOH-A and EVOH-B) described in Example 1 are shown in Table 4.

As is apparent from the results shown in Table 4, in the intermediate layers EVOH-A1 and EVOH-B1 of the bottles formed by co-injection/biaxial draw-blowing of PET and the starting EVOH-A or EVOH-B alone, the effect of increase of the molecular weight as observed in EVOH-C was not attained but the weight average molecular weight rather decreased.

According to the methods described in Example 2, the falling shock test and oxygen permeability test were carried out on the bottles A1 and B1.

At the falling shock test, as described in Example 2, in case of the bottle I comprising the inner and outer layers of PET and the intermediate layer of EVOH-C, obtained by co-injection/biaxial draw-blowing, breakage or delamination was not observed in any sample. In contrast, in case of the bottle A1, two samples were broken at the eighth falling test, one sample was broken at the ninth falling test and two samples were broken at the tenth falling test, and delamination was caused in all of the remaining samples. In case of the bottle B1, two samples were broken at the fifth falling test, two samples were broken at the sixth falling test, one sample was broken at the eighth falling test and three samples were broken at the tenth falling test, and delamination was observed in the remaining two samples.

At the oxygen permeability test, as described in Example 2, the oxygen permeability of the bottle of PET alone was 5.9 cc/m$^2$·day·atm and the oxygen permeability of the bottle I was 2.2 cc/m$^2$·day·atm. In contrast, the oxygen permeability of the bottle A1 was 4.2 cc/m$^2$·day·atm and the oxygen permeability of the bottle B1 was 5.1 cc/m$^2$·day·atm.

Three samples each of the bottles I, A1 and B1 subjected to the oxygen permeability test were optionally selected, and the intermediate layers were gently peeled and their thicknesses were measured by using a micrometer having a precision of 0.1 μm. Supposing that the position of the extension from the mold number of the mouth portion was the position of 12 o'clock on a watch dial, the positions of 12 o'clock, 3 o'clock, 6 o'clock and 9 o'clock were selected, and the measurement was effected on the crossing points between these four positions in the circumferential direction and the positions of 20 mm, 40 mm, 60 mm, 80 mm and 100 mm from the bottom corner in the longitudinal direction, that is, 20 points as a whole.

The results of the measurement of the thickness of the intermediate layer of each bottle (unit: μm, arithmetic mean of three samples) are shown in Tables 5 through 7. Namely, the results of the bottle I (intermediate layer: EVOH-C) are shown in Table 5, the results of the bottle A1 (intermediate layer: EVOH-A1) are shown in Table 6 and the results of the bottle B1 (intermediate layer: EVOH-B1) are shown in Table 7.

The arithmetic mean (μm) of the thickness of the intermediate layer at all the measurement positions and the variation coefficient indicating the deviation of the thickness ($=100\times$ standard deviation/arithmetic mean, %), determined with respect to each of the bottles I, A1 and B1, are shown in Table 8.

From the results shown in Table 8, it is seen that the average thickness of the intermediate layer of the ethylene/vinyl alcohol copolymer having the molecular weight increased under the above-mentioned coinjection/biaxial draw-blowing conditions (EVOH-C) is apparently larger than the average thickness of the intermediate layer of the ethylene/vinyl alcohol copolymer EVOH-A1 or EVOH-B1, and the thickness unevenness (the variation coefficient, that is, the degree of the thickness unevenness) is much smaller in EVOH-C than in EVOH-A1 or EVOH-B1.

TABLE 4

| EVOH | Mw | Mn | Mw/Mn | Remarks |
|---|---|---|---|---|
| A | 72700 | 35700 | 2.04 | EVOH material described in Example 1 |
| A1 | 61000 | 32200 | 1.89 | intermedite layer formed by using EVOH-A |
| B | 56700 | 28200 | 2.01 | EVOH material described in Example 1 |
| B1 | 47200 | 26900 | 1.75 | intermediate layer formed by using EVOH-B |
| C | 113600 | 49500 | 2.29 | EVOH layer described in Example 1 |

TABLE 5

Intermediate Layer of Bottle I

| Measurement Positions Longitudinal Direction | Circumferential Direction | | | |
|---|---|---|---|---|
| | 12 o'clock | 3 o'clock | 6 o'clock | 9 o'clock |
| 100 mm | 37 | 33 | 36 | 35 |
| 80 mm | 33 | 40 | 39 | 33 |
| 60 mm | 33 | 34 | 35 | 35 |
| 40 mm | 30 | 30 | 32 | 31 |
| 20 mm | 25 | 23 | 29 | 28 |

TABLE 6

Intermediate Layer of Bottle A1

| Measurement Positions Longitudinal Direction | Circumferential Direction | | | |
|---|---|---|---|---|
| | 12 o'clock | 3 o'clock | 6 o'clock | 9 o'clock |
| 100 mm | 30 | 31 | 34 | 38 |
| 80 mm | 17 | 18 | 21 | 20 |
| 60 mm | 18 | 17 | 17 | 20 |
| 40 mm | 16 | 16 | 16 | 23 |
| 20 mm | 15 | 18 | 16 | 16 |

TABLE 7

Intermediate Layer of Bottle B1

| Measurement Positions Longitudinal Direction | Circumferential Direction | | | |
|---|---|---|---|---|
| | 12 o'clock | 3 o'clock | 6 o'clock | 9 o'clock |
| 100 mm | 33 | 32 | 33 | 32 |
| 80 mm | 23 | 22 | 22 | 23 |
| 60 mm | 11 | 12 | 12 | 13 |
| 40 mm | 7 | 3 | 3 | 2 |
| 20 mm | 2 | 2 | 2 | 2 |

TABLE 8

| EVOH | Arithmetic Mean of Thickness ($\mu m$) | Thickness Variation Coefficient (%) |
|---|---|---|
| intermediate layer of bottle I | 32.55 | 12.80 |
| intermediate layer of bottle A1 | 20.85 | 31.82 |
| intermediate layer of bottle B1 | 14.55 | 79.60 |

We claim:

1. An injection-molded body which comprises an ethylene/vinyl alcohol copolymer having a weight average molecular weight (Mw) of at least 80,000 and a molecular weight distribution (Mw/Mn) of at least 2.1.

2. An injection-molded body obtained by injecting a melt of an olefin/vinyl alcohol copolymer into a cooled mold through an injection nozzle, wherein the olefin/vinyl alcohol copolymer in the injection-molded body has a weight average molecular weight (Mw) of at least 80,000 and a molecular weight distribution (Mw/Mn) of at least 2.1.

3. An injection-molded body as set forth in claim 2, wherein the olefin/vinyl alcohol copolymer in the injection-molded body has a weight average molecular weight (Mw) of at least 100,000.

4. An injection-molded body as set forth in claim 2, wherein the olefin/vinyl alcohol copolymer is an ethylene/vinyl alcohol copolymer.

5. An injection-molded body which comprises an ethylene/vinyl alcohol copolymer having a weight average molecular weight (Mw) of at least 80,000 and a molecular weight distribution (Mw/Mn) of at least 2.1, said molded body being obtained by melt-kneading a composition comprising (i) a high-molecular-weight olefin/vinyl alcohol copolymer having a melt flow rate of 0.4 to 6.0 g/10 min as determined at 190° C. and a vinyl alcohol content of 40 to 80 mole % and (ii) a low-molecular-weight olefin/vinyl alcohol copolymer having a melt flow rate of 3.0 to 60 g/10 min as determined at 190° C., which is higher by at least 0.5 g/10 min than that of the high-molecular-weight ethylene/vinyl alcohol copolymer (i), and a vinyl alcohol content of 45 to 85 mole %, at a weight ratio of from 98/2 to 40/60, and injecting the melt-kneaded composition into a mold through a nozzle.

6. A multi-layer injection-molded body which comprises inner and outer layers of a creep-resistant thermoplastic resin and an intermediate layer of an ethylene/vinyl alcohol copolymer, wherein the ethylene/vinyl alcohol copolymer has a weight average molecular weight (Mw) of at least 80,000 and a molecular weight distribution (Mw/Mn) of at least 2.1.

7. A multi-layer injection-molded body as set forth in claim 6, wherein said intermediate layer has a thickness deviation below 30% as defined by the following formula:

$$\text{Thickness Deviation} = 100 \times \frac{\text{Standard Deviation}}{\text{Arithmetic Mean}}$$

8. A multi-layer injection-molded body comprising inner and outer layers of a creep-resistant thermoplastic resin and an intermediate layer of an olefin/vinyl alcohol copolymer, which is obtained by simultaneously or sequentially injecting the olefin/vinyl alcohol copolymer and the creep-resistant thermoplastic resin, wherein the olefin/vinyl alcohol copolymer in the multi-layer injection-molded body has a weight average molecular weight (Mw) of at least 80,000 and a molecular weight distribution (Mw/Mn) of at least 2.1.

9. A multi-layer injection-molded body as set forth in claim 8, which is a vessel, a vessel lid or a preform for formation of a vessel.

* * * * *